April 6, 1954     R. W. WILSON     2,674,279
HITCH FOR REAR MOUNTED BELT DRIVEN IMPLEMENTS
Filed March 16, 1953     2 Sheets-Sheet 1
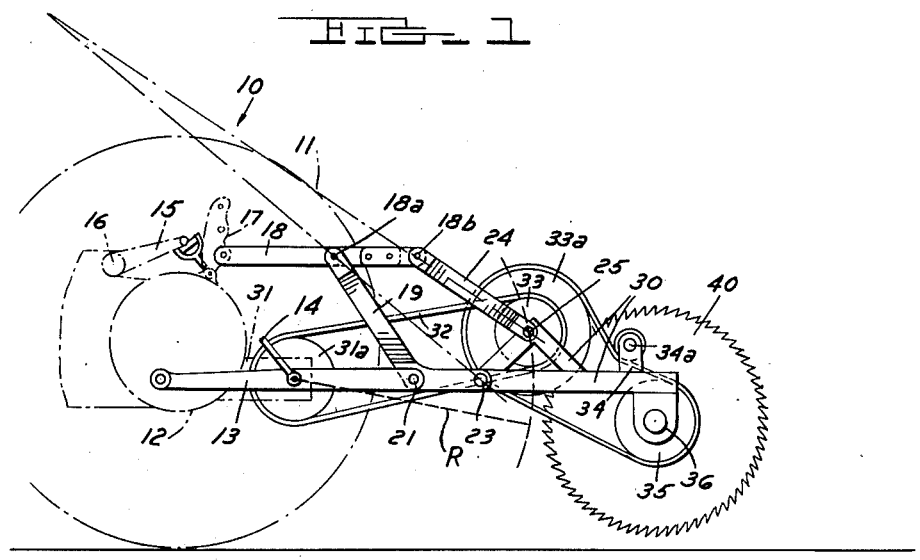
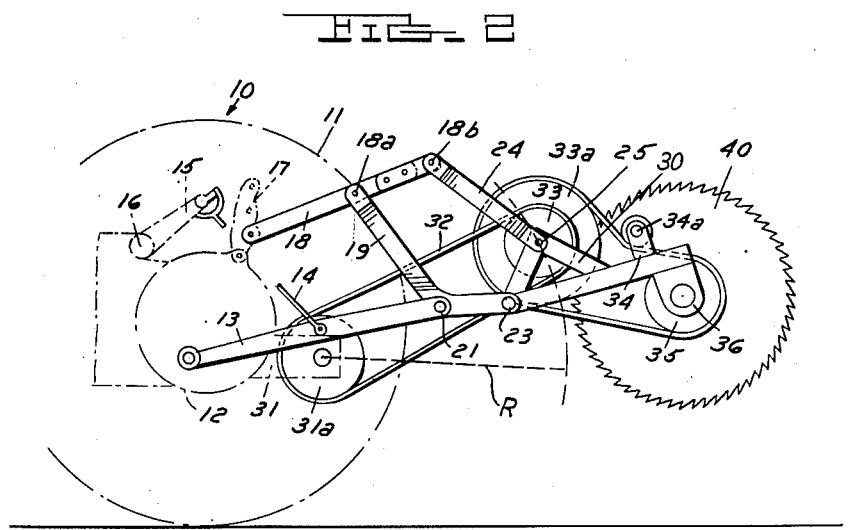
INVENTOR.
RAYMOND W. WILSON April 6, 1954   R. W. WILSON   2,674,279
HITCH FOR REAR MOUNTED BELT DRIVEN IMPLEMENTS
Filed March 16, 1953   2 Sheets-Sheet 2
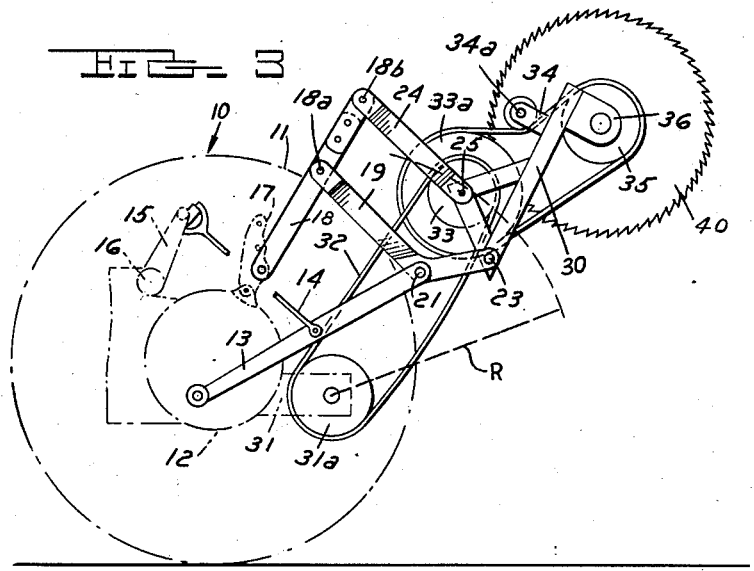
INVENTOR.
RAYMOND W. WILSON
BY
ATTORNEYS Patented Apr. 6, 1954

2,674,279

UNITED STATES PATENT OFFICE 2,674,279

HITCH FOR REAR MOUNTED BELT DRIVEN IMPLEMENTS

Raymond W. Wilson, Ferndale, Mich., assignor, by mesne assignments, to Ford Motor Company, Dearborn, Mich., a corporation of Delaware Application March 16, 1953, Serial No. 342,395

3 Claims. (Cl. 143—43)

This invention relates to a hitch mechanism for tractors having rear mounted implements. In one aspect this invention relates to a hitch mechanism for attaching rear mounted, belt driven implements to tractors equipped with power lifted hitch links. In a further aspect this invention relates to an improved hitch mechanism for attaching a rear mounted, belt driven saw to tractors having laterally spaced power lifted, trailing hitch links.

The present invention provides a hitch mechanism for tractors accommodating rear mounted, belt driven implements, wherein power is continuously supplied to said implements through a range of vertical movement of said implements. In the specific embodiment hereinafter illustrated and described in detail, the hitch mechanism of the present invention is shown applied to a belt driven rotary saw. Said hitch mechanism is of such configuration that belt tension is maintained and thus power is continuously supplied to the saw from a lowered position thereof to a partially raised position. Upon elevation of the tractor's implement lift mechanism to an uppermost position the hitch causes the saw to be raised to a transport position and also causes it to become inoperative. The hitch thus makes it possible for the saw to be used in cutting felled timber in situ, into suitable lengths for subsequent use, and also provides a means for positioning a brush cutting saw at varying distances above the ground while power is continuously supplied thereto. The present hitch also provides a means for transporting a saw in raised, inoperative position.

It is therefore an object of the present invention to provide a hitch mechanism for tractors having rear mounted, belt driven implements, wherein power is continuously transmitted to the implement throughout a range of vertical movement thereof.

A still further object of the present invention is to provide a hitch mechanism for a tractor having a rear mounted, belt driven saw to permit cutting at varying heights above the ground.

The specific nature of this invention, as well as other objects and advantages thereof, will become apparent to those skilled in the art from the following detailed description, taken in conjunction with the attached sheets of drawings, on which, by way of a preferred example only, is illustrated one embodiment of this invention.

On the drawings:

Figure 1 is a side view of a tractor showing the hitch mechanism of the present invention attached thereto and supporting a circular saw in a lower operative position.

Figure 2 is a side view of a tractor having the hitch of the present invention attached thereto and supporting a circular saw in a partially raised, operative position.

Figure 3 is a side view of a tractor showing the hitch of the present invention attached thereto and supporting a circular saw in an inoperative, transport position.

Figure 4 is a plan view of Figure 1.

As shown on the drawings:

In Figures 1–4, reference numeral 10 refers generally to a tractor of well known make having a three-point linkage for connection to a power liftable implement wherein 11 and 11a are the rear wheels of said tractor and 12 is the differential and rear axle housing. The draft links 13 and 13a are pivotally attached, for substantially vertical, swinging movement, on either side of the differential to the rear axle housing 12 at points underneath said housing. These draft links 13 and 13a are attached by means of connecting rods 14 and 14a, shown broken away, to lift arms 15. These lift arms 15 are fixedly attached to a rock shaft 16 which is rotatable by means of a conventional hydraulic piston and yoke assembly, not shown, to impart an arcuate lifting movement to said lift arms. A rocker 17 is pivotally secured to the upper portion of differential housing 12 and top link 18 is pivotally attached to said rocker.

The hitch of the present invention is shown in the drawings attached to the draft links 13 and 13a and to the top link 18 and consists generally of a pair of L-shaped levers 19 and 19a which are pivotally attached at their top ends to a medial portion of top link 18 as at point 18a, and at the apex to the rear ends of draft arms 13 and 13a, as indicated at 21 and 21a. The rear ends of said L-shaped levers 19 and 19a are pivotally attached to hitch points 23 and 23a of a rotary saw frame indicated generally at 30.

Links 24 and 24a are pivotally attached at their top ends to the rearward end of top link 18 as at point 18b and at their bottom ends to hitch points 25 and 25a of said rotary saw frame 30. Thus when the tractor's implement lift mechanism is actuated the hitch causes the saw to be raised through an operable range on up to a top, transport position, in which latter position the saw is rendered inoperative.

To transmit power to the saw, or other implement as may be apparent to one skilled in the art, tractor 10 is equipped with a suitable power take-off mechanism shown schematically at 31 in Figures 1–3, which power take-off is fitted with pulley 31a in a conventional manner. A driven pulley 33 is rotatably mounted on saw frame 30 so that its axis of rotation is a horizontal shaft, suitably extending through the lower ends of bracket members 24 and 24a. Said shaft and said brackets are held in assembled relationship by suitable means such as cotter pins placed through holes in said shaft on either side of said bracket members. A belt 32 transmits power from driving pulley 31a to driven pulley 33. Driven pulley 33 is secured to a driving pulley 33a which transmits power by means of belt 34, idler wheel 34a and pulley 35, attached to the saw mandrel 36. Power is thus transmitted to saw 40.

When the power lifting mechanism of the tractor 10 is actuated, the lift arms 15 will rise and lift the hitch links 13 and 13a by means of connecting rods 14 and 14a. The hitch mechanism of the present invention will thus be raised and the saw driving pulleys, etc., will also be raised through an operable range. In Figures 1 and 2 it will be noted that the axis of pulleys 33 and 33a, as represented by point 25, swings through an arc substantially described by radius R. Thus belt tension will be maintained and power will be transmitted to the saw at any point on said arc. However, when the saw is lifted to the transport position, shown in Figure 3, the axis of pulleys 33 and 33a moves toward driving pulley 31a and belt 32 becomes slack. Thus in the transport position the saw is inoperative.

The present hitch therefore provides a means for continuously operating the saw from a raised position down through a lowered position or at any desired point between said limits. While the hitch of the present invention has been shown as applied to the suspension of a vertically mounted rotary saw, it will be obvious to those skilled in the art that the present hitch is also applicable to the suspension of a horizontally mounted saw adapted to use in felling small timber, cutting brush and the like. When applied to a horizontally mounted saw, the belt 34 can be twisted through a 90 degree angle as is well known, or a suitable right angle drive can be employed.

It will also be obvious to those skilled in the art that the present hitch can be employed to support a cordwood saw, i. e., a vertically mounted saw equipped with a suitable table for positioning small timber to be cut into short lengths.

The advantages of the present invention will be obvious to those skilled in the art. For example, the hitch of the present invention provides a means for cutting down-timber to length while the operator controls saw movement from the safety of the tractor seat and employing the convenience of the tractor's hydraulic controls. The present hitch also advantageously provides a means for positioning a brush cutting saw for felling small timber, clearing brush and the like, all from the safety of the tractor seat.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a three-point implement suspension system comprising a pair of laterally spaced, power lifted draft links pivotally mounted at one end to the rear axle housing, and a top link pivotally mounted at one end to said housing, said tractor having a power take-off pulley mounted horizontally on said rear axle housing between said draft links, an implement adapted for mounting to said tractor, said implement having a power transmitting pulley rotatably mounted thereon, said implement also having a lower pair of coaxial, laterally spaced hitch pins, and an upper hitch pin, and a belt operatively connecting said pulleys; an improved implement hitch comprising a pair of laterally spaced, generally L-shaped levers, said levers being comprised of a generally upright top portion rigidly joined at a vertex to a generally horizontal bottom portion, said L-shaped levers being pivotally attachable at their top ends to a median point on said top link, and at said vertexes respectively to the rear ends of said draft links, and at their other ends respectively to said lower hitch pins on said implement, and a link connection pivotally attachable at one end to the rear end of said top link and at the other end to the upper hitch pin on said implement, whereby upon lifting of said tractor draft links, said hitch causes said implement to be moved vertically through an operable range wherein said belt is maintained at a substantially constant tightness, and thence to an inoperative position wherein said belt becomes slack.

2. The combination defined in claim 1 wherein said upper hitch pin on said implement is axially aligned with the axis of said power transmitting pulley, whereby upon lifting of said tractor draft links, said hitch causes said implement to be moved so that the axis of said power transmitting pulley on said implement frame describes an arc of substantially constant radius during initial lifting movement, and subsequently describes an arc of decreasing radius during further lifting movement.

3. For use with a tractor having a three-point implement suspension system comprising a pair of laterally spaced, power liftable, draft links pivotally mounted at one end to the rear axle housing, and a top link pivotally mounted at one end to said housing, said tractor having a power take-off pulley mounted horizontally on said rear axle housing between said draft links, an implement adapted for mounting to said tractor, said implement having a power transmitting pulley rotatably mounted thereon, said implement also having a lower pair of laterally spaced, coaxial hitch pins and an upper pair of laterally spaced coaxial hitch pins, said upper pair of hitch pins being laterally aligned with the axis of said power transmitting pulley, and a belt connecting said power take-off pulley and said power transmitting pulley; an improved implement hitch comprising a pair of laterally spaced, generally L-shaped levers, said levers being comprised of a generally upright top arm rigidly joined at a vertex to a generally horizontal bottom arm, said L-shaped levers being pivotally attachable at their top ends to a median point on said top link, and at said vertexes respectively to the rear ends of said draft links, and at their other ends respectively to said lower hitch pins on said implement, and a pair of laterally spaced link connectors pivotally attachable at one end to the rear end of said top link and at their other ends respectively to said upper hitch pins on said implement, whereby upon lifting of said tractor draft links, said hitch causes said axis of said power transmitting pulley on said implement frame to describe an arc of substantially constant radius during a lower range of lifting movement, and subsequently to describe an arc of decreasing radius during an upper range of lifting movement.

References Cited in the file of this patent

UNITED STATES PATENTS

| Number | Name | Date |
|---|---|---|
| 2,350,880 | Dellinger et al. | June 6, 1944 |
| 2,440,422 | Westmoreland | Apr. 27, 1948 |
| 2,588,953 | Bausch et al. | Mar. 11, 1952 |